United States Patent [19]

Michimae et al.

[11] Patent Number: 4,759,884

[45] Date of Patent: Jul. 26, 1988

[54] APPARATUS FOR GAS WET TREATMENT

[75] Inventors: Kiyoharu Michimae; Akira Amamiya, both of Takaoka; Shozo Onogi, Oyabe, all of Japan

[73] Assignees: The Brook Club, Inc., Haydenville, Mass.; M.C.K. Kabushiki Kaisha, Toyama, Japan

[21] Appl. No.: 5,257

[22] Filed: Jan. 20, 1987

[30] Foreign Application Priority Data

Jan. 20, 1986 [JP] Japan .................................. 61-8035

[51] Int. Cl.$^4$ ............................................. B01F 3/04
[52] U.S. Cl. .................................. 261/113; 261/114.3
[58] Field of Search ............................. 261/113, 114.3

[56] References Cited

U.S. PATENT DOCUMENTS

| 33,086 | 8/1861 | Huwald | 261/113 |
| 1,792,164 | 2/1931 | Holland | 261/113 |
| 3,075,752 | 1/1963 | Leva | 261/113 |
| 3,446,489 | 5/1969 | Leva | 261/113 |
| 3,933,953 | 1/1976 | Leva | 261/113 |
| 3,941,572 | 3/1976 | Uchiyama et al. | 261/113 |
| 4,310,475 | 1/1982 | Leva | 261/113 |
| 4,532,087 | 7/1985 | Beronyak et al. | 261/114.3 |

FOREIGN PATENT DOCUMENTS

| 592429 | 7/1925 | France | 261/113 |
| 53-39270 | 8/1978 | Japan | 261/113 |

Primary Examiner—Tim Miles
Attorney, Agent, or Firm—Lee C. Robinson, Jr.

[57] ABSTRACT

An apparatus for gas wet-treatment which includes at least one perforated plate having a unique arrangement of round holes. The holes are provided with a cross-sectional area larger than about 1 cm$^2$ and a length of between 2 and 10 cm. The central axes of least some of the round holes have portions which meet the perforated plate at an acute angle. Gas is directed upwardly through the plate, while liquid proceeds in a downward direction to provide countercurrent contacting of the gas and the liquid.

2 Claims, 2 Drawing Sheets

APPARATUS FOR GAS WET TREATMENT

BACKGROUND OF THE INVENTION

The present invention relates to an apparatus for gas wet treatment, and more particularly to a perforated or sieve plate used in the apparatus for gas wet treatment such as distillation, absorption, neutralization, removal of dust from the gas and the like.

DESCRIPTION OF THE PRIOR ART

The apparatus for gas wet treatment such as a perforated plate tower is an apparatus used widely for counter-current contacting of vapor or gas and liquid to effect separation by distillation or absorption. In general, such an apparatus comprises a cylindrical vessel with internals designed to obtain multiple contacting of ascending vapor and descending liquid, together with means for introducing or generating liquid at the top and the vapor at the bottom. A variety of internal devices have been used to obtain more efficient contacting of vapor and liquid in the apparatus. For example, refer to the following publications: C. S. Robinson, E. R. Gilliland, "Element of Fractional Distillation", McGraw-Hill (1950); E. Kirschbaum, "Distillierung Rektifizier Technik", Springer (1950); "Handbook of Chemical Engineering" edited by Society of Chemical Engineering, Maruzen (1958); J. H. Perry, "Chemical Engineer's Handbook", McGraw-Hill (1963); G. G. Brown et al., "Unit Operations", John Wiley & Sons (1951); T. P. Carney, "Laboratory Fractional Distillation", McMilland (1949); Moris, Jackson, "Absorption Towers", Butterworth & I. C. I(1953); and Max Leva, "Tower Packings and Packed Tower Design", The United States Stoneware Co. (1953).

The most widely used devices in such apparatus are the bubble cap plate, the perforated plate, and the packed column.

The perforated plate is a horizontal deck with a multiplicity of round holes or rectangular slots for distribution of vapor through the liquid.

The perforated plate of the prior art has a large number of holes for distribution of vapor through liquid and each of the holes has an inside diameter of about 3 mm and a relatively short length such as 2 cm or less. The perforated plate is widely used for a perforated plate tower owing to its relatively simple structure.

The holes in a conventional perforated plate used in a gas distribution type of absorber or dust-removing apparatus each have an inside diameter of not more than 1.0 cm and a length as short as possible.

There is also a wetted wall type of apparatus such as a liquid distribution type of the apparatus. In this case, a gas flow, as a general rule, is passed through the liquid in the same pipe from an inlet to an outlet of the apparatus.

FIG. 1 is a schematic sectional view of the conventional perforated plate provided in a rectifier or gas absorber. The inner space of the tower wall 1 is partitioned by a plurality of perforated plates 10 (only one of them is shown) to effect counter-current contacting of vapor 13 and liquid 12. The ascending vapor 13 passes through the holes 11 of the perforated plate 10 and the liquid 12 and the descending liquid 12 flows down a downspout 14.

The perforated plate tower has advantages such as relatively easy cleaning of the tower interior, good contact of vapor and liquid and thus a minimum of channeling, etc. However, the conventional perforated plate provided in the tower has holes 11 of small inside diameter, so that when a gas flow is contacted with the liquid having high viscosity and containing solid particles and precipitates through the perforated plates 10, their holes 11 are apt to be clogged, resulting in a sharp drop in pressure across the plate, and thus operators must clean the plates 10 once in three days to one week.

It is therefore an object of the present invention to provide an apparatus for gas wet treatment provided with a plurality of perforated plates each having a number of round holes for distribution of vapor through liquid each of which holes has a cross-sectional area larger than about 1 $cm^2$ and a length ranging from about 2 up to 10 cm in order to overcome the sharp pressure drop across the plate and the hole clogging of the plates to obtain a highly efficient gas treatment.

SUMMARY OF THE INVENTION

According to the present invention, there is provided an apparatus for gas wet treatment provided with at least one perforated plate having a number of round holes for distribution of vapor through liquid. Each of the holes has a cross-sectional area larger than about 1 $cm^2$ and an axial length ranging from about 2 up to 10 cm. Preferably, the holes have a cross-sectional area larger than 1.5 $cm^2$ (inside diameter: 1.4 cm), and an axial length ranging from about 4 up to 7 cm.

By providing such a perforated plate 10a or 10b, it is suspected that a gas flow 13 is contacted with liquid 12 as shown in FIG. 4. The ascending gas flow 13 comes into contact with the liquid descending through a pipe shaped hole 11a of the perforated plate 10a to form a vapor passage opening or aperture 14 in the center of the pipe shaped liquid of which the inner surface is rippled. Such a structure promotes mixing of vapor and liquid, and overcomes clogging of the perforated plate to reduce the pressure drop across the plate and thus to provide a highly efficient gas treatment.

DETAILED DESCRIPTION OF THE PREFERRED EMBODIMENTS OF THE INVENTION

Figure 1:
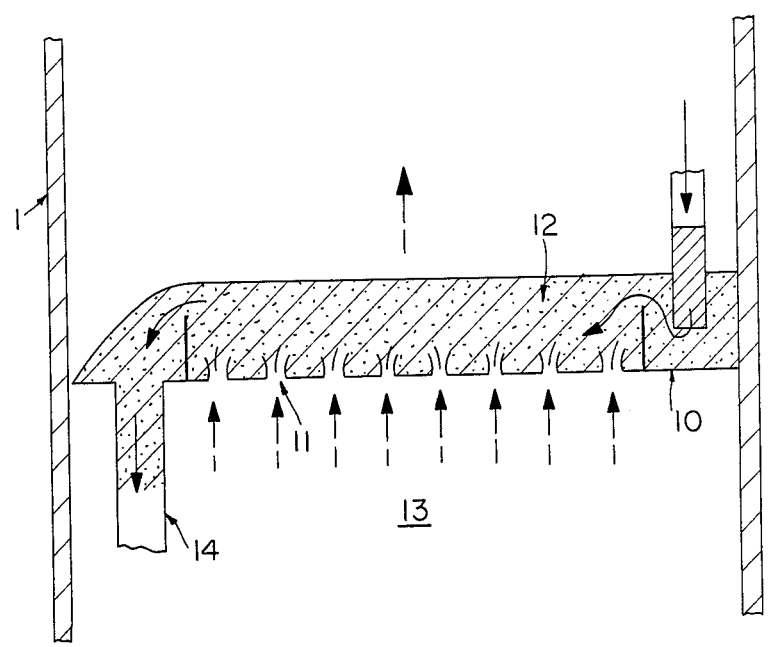
FIG. 1 is a schematic sectional view of a conventional perforated plate.
Figure 2:
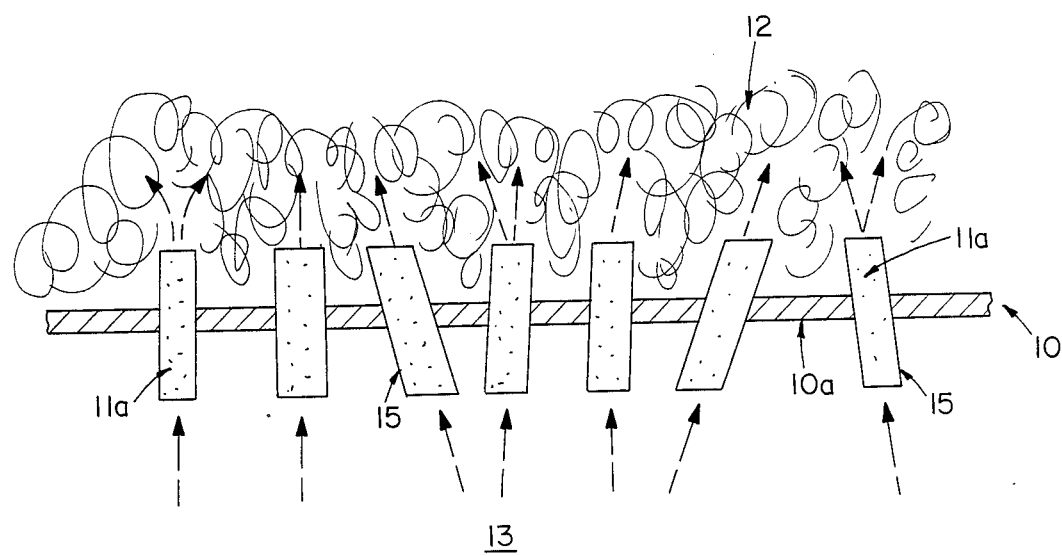
FIG. 2 is a schematic sectional view of a preferred embodiment of perforated plate according to the present invention.

Referring to the drawings, in which like numerals indicate like elements throughout the several views, in particular, FIG. 2 shows a schematic sectional view of a perforated plate 10a used in an apparatus for wet treating of a gas flow according to the present invention. The perforated plate 10a comprises a plate body 10 having a relatively thin thickness, for example, a steel plate of about 5 to 10 mm in thickness, and a number of pipes 15 which have a predetermined inside diameter and a length and of which vertical axes are arranged at random and fixed to the plate body 10. Each of the pipes 15 has a hole 11a having a a cross-sectional area larger than 1.0 cm², preferably 1.5 cm² (I.D=14 mm), and a length larger than 2 cm, preferably 4 cm.

Figure 3:
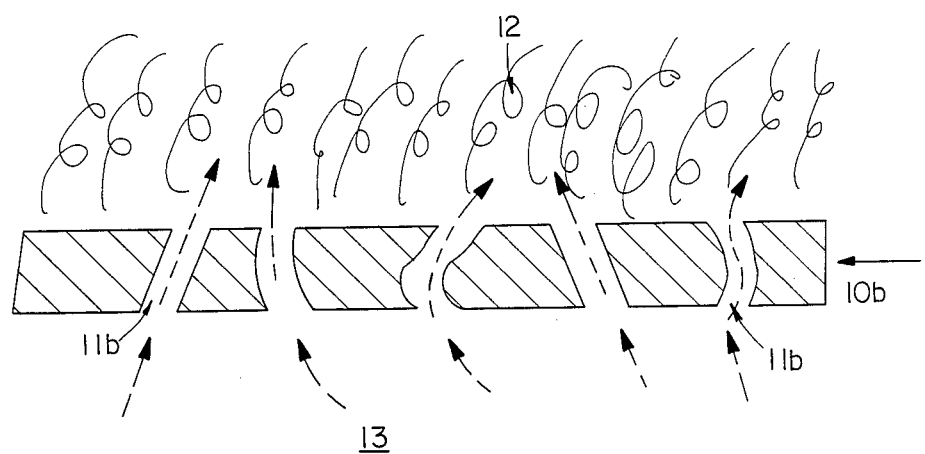
FIG. 3 is a schematic sectional view of a second preferred embodiment of perforated plate according to the present invention.
Figure 4:
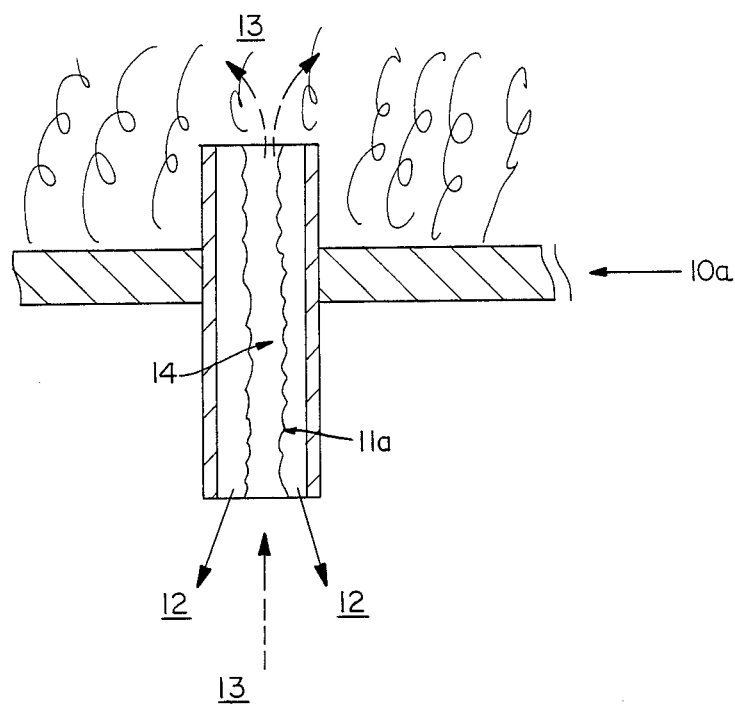
FIG. 4 is a partly enlarged sectional view of the perforated plate according to the present invention.

FIG. 3 shows a schematic sectional view of another preferred embodiment of perforated plate 10b according to the present invention. The perforated plate 10b has a number of holes arranged in irregular directions and each of the holes has a thickness larger than 2 cm, preferably, 4 cm and less than 7 cm, and a cross-sectional area larger than 1.0 cm², preferably 1.5 cm² (I.D=14 mm).

Preferably, the holes 11a or 11b are arranged in irregular directions. Various shaped holes can also be provided without specifying their straightness, and cross-section and end shapes.

The experimental results of the apparatus for wet treating of a gas flow provided with the perforated plates according to the present invention are as follows:

EXAMPLE 1

A flow of gas having a temperature of 600° C. at an inlet of the apparatus, a capacity of 1,400 Nm³/hr., a dust concentration of 2 g/Nm³, and a hydrochloric acid concentration of 0.3% was countercurrently contacted with a caustic soda aqueous solution of pH 6 to 7 at a solution to gas ratio of about 10 1 per m³ using the apparatus for wet treating of the gases which has an effective diameter 70 cm, an open area percentage of 10 to 18, is provided with three stages of perforated plates each having a number of holes of 2.8 cm in diameter and 10 cm in length and four stages of sprays. The resulting gas flow had a dust concentration of less than 0.1 g/Nm³ and a hydrochloric acid concentration of less than its identification limit.

EFFECTIVENESS OF THE INVENTION

The pressure drop across the plate and hole clogging of the perforated plate were overcome and a highly efficient treatment of gas was obtained by providing the perforated plates having a number of holes of larger than 1 cm² in cross-sectional area and ranging from 2 up to 10 cm in length.

We claim:

1. An apparatus for gas-wet treatment, the apparatus comprising at least one perforated plate for countercurrent contacting of vapor and liquid within the apparatus, and means defining a multiplicity of round holes in said plate for distribution of vapor through the liquid, each of said round holes having a cross-sectional area larger than about 1 cm² and a length of from about 2 cm to about 10 cm, the central axes of at least some of said round holes having portions which meet said perforated plate at an accute angle, said holes being dimensioned so that under normal flow conditions, said liquid flows through each of said holes in an annular pipe-shaped stream having a rippled inner surface to thereby form a vapor passage along the central portion of the stream and to promote mixing of the vapor and the liquid, the configuration of said holes minimizing clogging of the perforated plate and avoiding an excessive pressure differential across the plate.

2. The apparatus as set forth in claim 1 wherein said perforated plate has a number of round holes each of which has a cross sectional area larger than about 1.5 cm² and a length of 4 up to 7 cm.

* * * * *